Dec. 18, 1923.

W. POOL

PUMPING DEVICE

Filed Dec. 28, 1921

1,477,850

Inventor
William Pool

Patented Dec. 18, 1923.

1,477,850

UNITED STATES PATENT OFFICE.

WILLIAM POOL, OF CRAYFORD, ENGLAND, ASSIGNOR TO VICKERS LIMITED, OF WESTMINSTER, LONDON, ENGLAND.

PUMPING DEVICE.

Application filed December 28, 1921. Serial No. 525,406.

*To all whom it may concern:*

Be it known that I, WILLIAM POOL, a subject of the King of Great Britain, residing at Manor Road, Crayford, in the county of Kent, England, have invented certain new and useful Improvements in or Relating to Pumping Devices, of which the following is a specification.

This invention relates to pumping devices and has for its chief object to ensure a constant rate of delivery of fluid against a variable resistance without danger of loss of fluid through slip or leakage.

According to the invention the pumping device comprises two pump elements (preferably of the gear type) arranged in series and so driven or proportioned that the delivery of one pump element is greater than that of the other which is supplied with fluid by the first pump element and which thus acts as a measuring device or meter to pass the quantity of fluid required per unit of time. The surplus fluid from the first pump element may pass through a branch conduit leading from the conduit between the two pump elements, to a by-pass or pressure balance valve which is also acted upon by the fluid in the delivery conduit of the second or meter pump element. This valve is preferably of the piston or diaphragm type and is so arranged that the pressures in the branch conduit and the said delivery conduit are opposed to each other so that as either predominates the moving member of the valve will be displaced to vary an orifice through which the excess liquid in the branch conduit can escape back into the inlet conduit of the first pump element. By these means the pressure in the branch conduit, and therefore in the conduit between the two pump elements, is kept equal to the pressure in the delivery conduit, that is to say, equal pressures are maintained at all times on both sides of the second or meter pump element and thus there can be no slip or leakage back. If for any reason the delivery pressure from the second or meter pump element varies, the pressure balance valve will automatically adjust the inlet pressure to the same degree; consequently the wear on the said pump element is reduced to a minimum.

In order that the said invention may be clearly understood and readily carried into effect the same will now be described with reference to the accompanying drawings, in which:—

Figure 1:
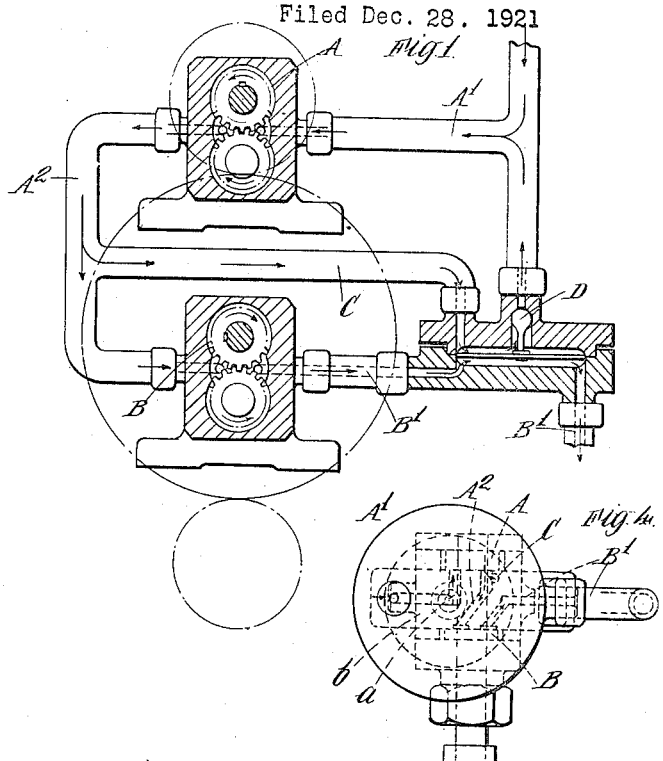

Figure 1 is a view shewing one form of pumping device in accordance with this invention.

Figure 4:
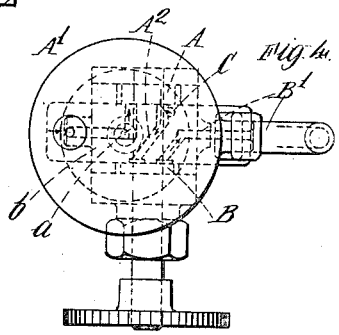
Figure 2:
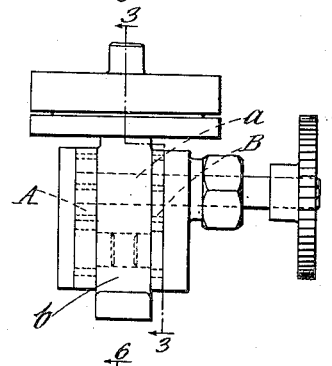
Figure 3:
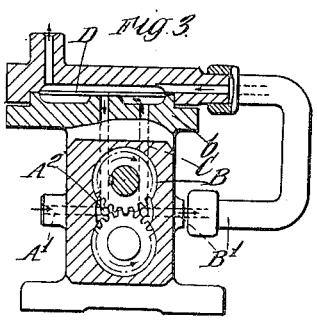

Figure 2 is an end elevation. Figure 3 is a section taken approximately on the line 3—3 of Figure 2 and Figure 4 is a plan, shewing another form of the pumping device, and Figures 5 and 6 are views similar to Figures 2 and 3 shewing still another form of the pumping device, the plane of section of Figure 6 being indicated approximately by the line 6—6 of Figure 5.

A, B are the aforesaid pump elements of which the pump element A has a greater delivery than the pump element B and which are shown as being of the gear type. A' is the inlet conduit of the pump element A, $A^2$ is the conduit leading fluid under pressure from the pump element A to the pump element B and B' is the delivery conduit of the latter pump element. C is the branch conduit leading from the conduit $A^2$ and D is the by pass or pressure balance valve which controls the escape of fluid from the branch conduit C into the inlet conduit A' in accordance with the pressure of the fluid in the delivery conduit B'. In the examples shewn this valve D is of the diaphragm type, the diaphragm being subjected on one side to the pressure of the fluid in the conduit C and on the other side to the pressure of the fluid in the conduit B'.

Figure 5:
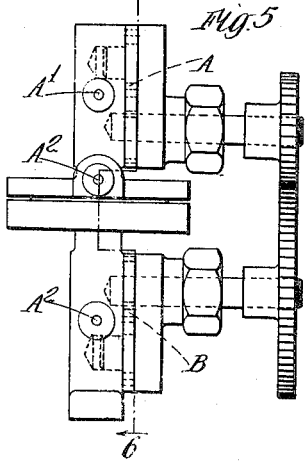
Figure 6:
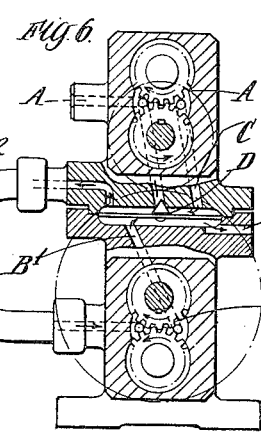

In the example shewn by Figures 1, 5 and 6 the pump elements A, B have the same rate of delivery per revolution and the greater delivery of the pump element A as compared with that of the pump element B is in this case obtained by rotating the pump element A at a higher speed than the pump element B for which purpose the said elements may be rotated through gear wheels as shewn driven from a motor common to both these pump elements. In the construction shewn by Figures 2 to 4 the pump elements A, B are rotated at the same speed from a common spindle $a$ and in this case, in order to obtain the desired difference in delivery, the pump element B is made of smaller width than the pump element A as will be seen from Figures 2 and 4. In this construction the pump elements A, B are arranged within the same casing and are separated by a plate $b$ which is formed with the conduits A', A², B', and C and which at its upper part carries the aforesaid pressure balance valve D. In the construction shewn by Figures 5 and 6 the pump elements A and B are arranged in separate casings with that for the pump element A mounted on that for the pump element B. The contacting portions of these casings are formed with recesses to form a chamber for the balance valve D as will be seen in Figure 6.

What I claim and desire to secure by Letters Patent of the United States is:—

1. In a pumping device, the combination of two pump elements working to give different delivery rates per unit of time, a conduit leading fluid under pressure from the pump element having the greater delivery rate to the pump element having the smaller delivery rate, and means for by passing the surplus fluid delivered from the first mentioned pump element.

2. In a pumping device, the combination of two elements working to give different delivery rates per unit of time, a conduit leading fluid under pressure from the pump element having the greater delivery rate to the pump element having the smaller delivery rate, and means automatically controlled in accordance with the pressures in the aforesaid conduit and in the delivery conduit of the second mentioned pump element for bye-passing the surplus fluid delivered from the first mentioned pump element.

3. In a pumping device, the combination of two elements working to give different delivery rates per unit of time, a connecting conduit leading fluid under pressure from the pump element having the greater delivery rate to the pump element having the smaller delivery rate, an inlet conduit for the first-mentioned pump element, a delivery conduit for the second-mentioned pump element, a branch conduit leading from said connecting conduit to the said inlet conduit, a valve between the last two mentioned conduits and means whereby said valve is controlled in accordance with the difference in the pressures existing in said connecting conduit and in said delivery conduit.

WILLIAM POOL.